United States Patent
Rösth et al.

(10) Patent No.: US 12,208,723 B2
(45) Date of Patent: Jan. 28, 2025

(54) CRANE, A VEHICLE, AND A METHOD OF THE CRANE

(71) Applicant: Hiab AB, Kista (SE)

(72) Inventors: Marcus Rösth, Hudiksvall (SE); Pelle Gustafsson, Hudiksvall (SE)

(73) Assignee: Hiab AB, Malmö (SE)

( * ) Notice: Subject to any disclaimer, the term of this patent is extended or adjusted under 35 U.S.C. 154(b) by 828 days.

(21) Appl. No.: 17/308,327

(22) Filed: May 5, 2021

(65) Prior Publication Data
US 2021/0347288 A1 Nov. 11, 2021

(30) Foreign Application Priority Data

May 6, 2020 (EP) .................................... 20173297

(51) Int. Cl.
*B60P 1/54* (2006.01)
*B66C 13/48* (2006.01)
(Continued)

(52) U.S. Cl.
CPC ............ *B60P 1/5423* (2013.01); *B66C 23/36* (2013.01); *B66C 23/88* (2013.01); *B66C 23/54* (2013.01)

(58) Field of Classification Search
CPC ......... B66C 23/36; B66C 23/88; B66C 23/54; B66C 13/48; B60P 1/5423
(Continued)

(56) References Cited

U.S. PATENT DOCUMENTS

| 2008/0053945 | A1 | 3/2008 | Schneider et al. |
| 2012/0152878 | A1* | 6/2012 | Ishihara ............... B66C 23/365 |
| | | | 212/280 |

(Continued)

FOREIGN PATENT DOCUMENTS

| DE | 102015112194 | 2/2017 |
| EP | 3257805 A1 | 12/2017 |

(Continued)

OTHER PUBLICATIONS

Extended European Search Report for corresponding EP Application No. 20173297.1, dated Nov. 6, 2020.

*Primary Examiner* — Rachid Bendidi
*Assistant Examiner* — Hossam M Abd El Latif
(74) *Attorney, Agent, or Firm* — Renner, Otto, Boisselle & Sklar, LLP.

(57) ABSTRACT

A crane arranged to be mounted to a vehicle and including a crane controller. The crane controller includes a machine learning algorithm, including a neural network trained to calculate a movements of a crane components based on a received trajectory instruction. A supervisory controller is provided arranged to evaluate the calculated movements by comparing an accuracy measure to a predefined safety margin. The accuracy measure is defined by the difference between a crane tip position resulting from the calculated movements when moved from a current position, and a position of the crane tip calculated by the supervisory controller, based on the received trajectory instruction and on positions of individual joints of said crane boom system, when moved from the current position, and to generate an overruling operating instruction for a system of actuators, in response to the accuracy measure being larger than the predefined safety margin.

12 Claims, 2 Drawing Sheets

(51) Int. Cl.
*B66C 23/00* (2006.01)
*B66C 23/36* (2006.01)
*B66C 23/88* (2006.01)

(58) Field of Classification Search
USPC .......................................................... 701/50
See application file for complete search history.

(56) References Cited

U.S. PATENT DOCUMENTS

| | | |
|---|---|---|
| 2015/0012188 A1 | 1/2015 | Schneider et al. |
| 2016/0121947 A1* | 5/2016 | Lyle .......................... E02F 9/08 |
| | | 180/54.1 |
| 2017/0031343 A1 | 2/2017 | Hatanaka |
| 2017/0037593 A1* | 2/2017 | Naik .......................... E02F 3/43 |
| 2017/0285584 A1* | 10/2017 | Nakagawa ........... G05B 13/027 |
| 2018/0029853 A1* | 2/2018 | Hamaguchi ............. B66C 23/88 |
| 2018/0230673 A1* | 8/2018 | Lee .......................... E02F 3/427 |
| 2018/0245304 A1* | 8/2018 | Koller ..................... E02D 13/06 |
| 2020/0240117 A1* | 7/2020 | Cheng ..................... E02F 9/205 |
| 2021/0223774 A1* | 7/2021 | Zhang ................... G05D 1/0088 |
| 2021/0284507 A1* | 9/2021 | Minami ................. B66C 13/063 |
| 2021/0370509 A1* | 12/2021 | Pivac ................. G05B 19/4155 |

FOREIGN PATENT DOCUMENTS

| | | |
|---|---|---|
| EP | 3553015 A1 | 10/2019 |
| JP | 2020015589 A | 1/2020 |

* cited by examiner

CRANE, A VEHICLE, AND A METHOD OF THE CRANE

This application claims priority of EP application Ser. No. 20173297.1 filed May 6, 2020, which is hereby incorporated herein by reference.

TECHNICAL FIELD

The present disclosure relates to a crane, a vehicle, and a method applied at the crane. More particularly, it relates to achieve a safe control of the crane when advanced control algorithms are applied.

BACKGROUND

Today, crane control algorithms are normally implemented in a crane controller and they are implemented in a way that their behaviour is predictable. This will however not be possible when modern techniques based on more advanced control algorithms, e.g. based upon neural networks, are applied.

When moving to new approaches to implement semi-autonomous and autonomous control algorithms that are too complex to implement in the currently used crane controller, there exists a need for a function acting as a safety feature in the crane control system.

Relevant prior art documents are listed in the following.

US20080053945A1 discloses a control system for lifting or transporting a common load using a plurality of cranes. The control system comprises input means for the pre-setting of a desired movement of the load or of the cranes, and at least one processing unit for determining of possible damage incidents for movement vectors of the cranes. The crane's movement is limited to those movement vectors without possible damage incidents. The anti-collision check can be related to a predetermined safety margin, which can be a distance between the cranes themselves or between the load and interfering objects.

US20150012188A1 discloses a crane controller that comprises a plausibility checking module for checking whether a trajectory provided by a trajectory planning module fulfils one or more plausibility criteria.

US-2017/0285584A1 discloses how a control command from a machine learning device is evaluated by a simulator, and first when the control command is determined good (safe operation) input to a robot is carried out. The operation of the robot is then evaluated to let the machine learning device perform learning.

DE-102015112194 discloses a method for planning, displaying and checking a lifting movement of a crane. A number of paths can be determined and based on any of a number of parameters the path(s) that can produce a safe movement between a predetermined starting point and a predetermined end point can be selected.

US-2017/0031343A1 discloses a machine tool that is provided with an operation evaluation section that outputs evaluation data on the machine tool's movement based on output from a machine learning device. The operation evaluation section evaluates a movement of each axis of the machine tool output from the machine learning device (based on a tool path commanded by a machining program). A numerical control section can set an allowable error indicating a range the tool deviates from a commanded tool path.

Generally, the present invention relates to a new approach of controlling kinematic systems. The new approach relates to a crane and a method to solve more complex kinematic system problems and at the same time take into account the situation the kinematic system is working in. Thereby, collision avoidance and control systems with high degree of freedom, e.g. a loader crane with 6 or 8 degrees of freedom, will then be possible to implement.

The problem with such new approach is that it will not be possible to prove that the system works as intended in all possible situations and the algorithm will therefore not be suitable to be implemented on a presently applied crane controller. Thus, the inventors have realized that additional measures need to be taken to supervise the system.

An object of the present invention is to achieve a crane and a method that addresses the problem with such new approach. I.e. an approach where it is not be possible to ensure that the crane works as intended in all possible situations and the algorithm will not be suitable to be implemented on a presently applied crane controller due to the high safety standards that apply to this type of equipment.

SUMMARY

The above-mentioned object is achieved by the present invention according to the independent claims.

Preferred embodiments are set forth in the dependent claims.

According to the present invention a crane controller is provided that comprises a neural network trained to calculate movements of crane components from a received trajectory of the crane tip and sensor input for the crane's actuators based on a received trajectory instruction from an input unit (e.g. a path planner). Further, the calculated movements of the crane components are evaluated by a separate supervisory controller through comparing an accuracy measure to a predefined safety margin.

The present invention is based upon the inventors' insight that the crane controller to perform the calculation of the inverse kinematic from the received trajectory of the crane tip and sensor input, is not entirely safe, due to the complex and advanced calculations required it is hard or even impossible to prove that this technique is working in all possible scenarios. Therefore, it is considered necessary to provide a supervisory controller to evaluate the operating instructions generated by the crane controller.

An important feature of the present invention is to provide a two-part system where the crane controller is configured to calculate movements of the crane components by a machine learning algorithm including a neural network, and the supervisory controller is configured to evaluate how well the effect of the calculated movements corresponds with the wanted trajectory. Thereby, the benefit is achieved of using a neural network for the inverse kinematic calculations without risking the safety.

The supervisory controller is configured to evaluate the effect of the extracted calculated movements and to make sure that the actuation is carried out in accordance with the command from the crane controller. This is achieved by evaluating the deviation of the crane tip from the commanded trajectory and could e.g. be based on sensor input regarding position speed or orientation of the joints etc. If the deviation is larger than a predefined safety margin the supervisory controller generates an overruling stop of the system in a safe manner.

In simple terms the system is commanded to run in a crane tip control mode (sometimes also referred to as boom tip control mode), and the complex task in doing this is by applying so-called inverse kinematic, i.e. calculating how the individual joints should move in order to realize the intended motion. This task is performed by the crane controller.

It is much simpler to calculate the position of the crane tip based on the position of the individual joints and, therefore, this task is performed by the supervisory controller in order to verify that the individual joint movements suggested by the crane controller are accurate and hence safe.

In one variation, the invention may be implemented in a way that the supervisory controller's evaluation of the crane controller's performance is performed after the calculated movements have taken effect. This is performed by comparing the current position of the crane tip to a calculated crane tip position based on a previous position and the received trajectory.

In another variation, the effect of proposed calculated movements may be estimated (simulated) and compared to the calculated crane tip position based on a previous position and the received trajectory.

The advantage achieved by the crane and method according to the present invention is that the crane and method now make it possible to benefit from the new technology without unnecessary safety risks, by using a combination of a crane controller and a supervisory controller, where the complex calculations are carried out by the crane controller and then the supervision is performed by the supervisory controller.

From a customer point of view, the present invention will enable progress in the area of autonomous and semi-autonomous motion and benefit from the progress in machine learning that offers a possibility to scale the solutions to more complex geometries than presently used. For example, it would then be possible to have a crane with one or two jibs working in crane tip control mode and at the same time have situational awareness to avoid collisions with obstacles in the work area, which is an increasing problem with the increase of multiple joints in the system.

DETAILED DESCRIPTION

The crane, method, and vehicle will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
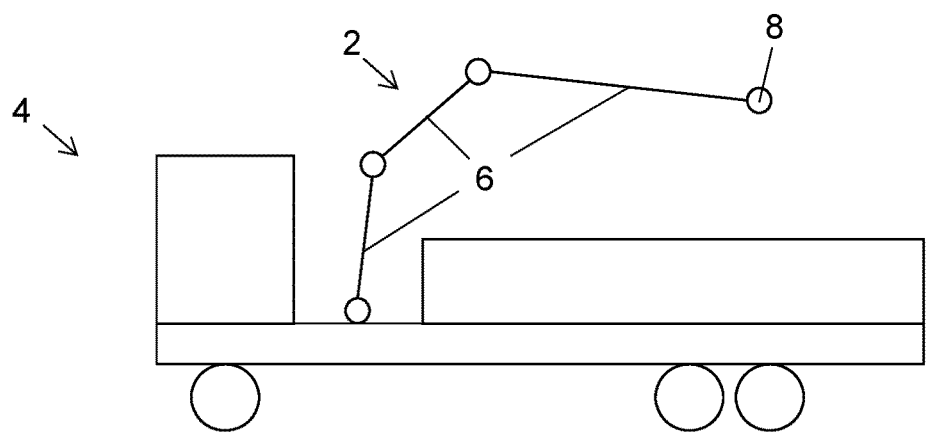
FIG. 1 is a schematic illustration of a vehicle comprising a crane according to the present invention.
Figure 2:
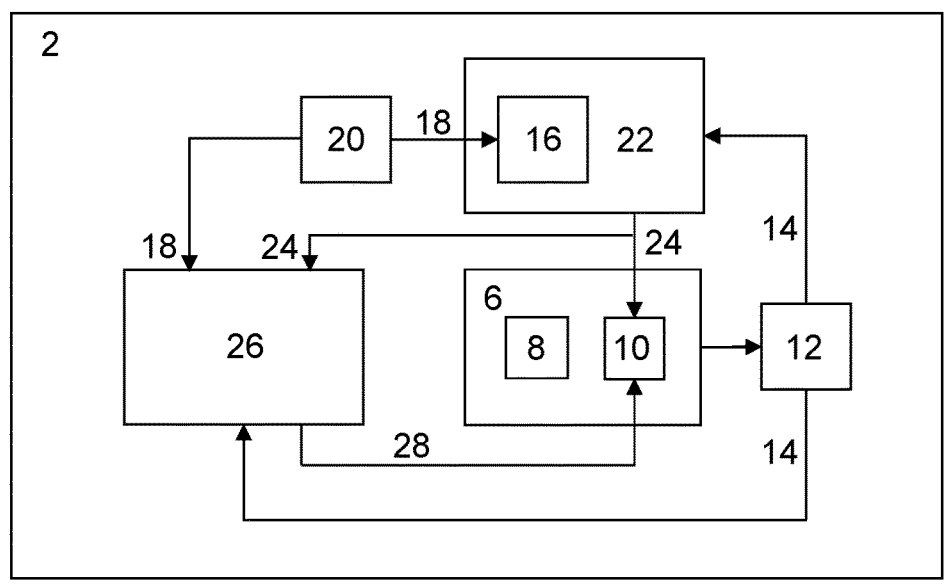
FIG. 2 is a block diagram schematically illustrating the crane according to the present invention.

With references to the schematic illustration of FIG. 1, and the block diagram of FIG. 2, a crane 2 is provided, arranged to be mounted to a vehicle 4. The vehicle may be any vehicle where a crane may be mounted, e.g. a load carrying vehicle, a forestry vehicle, etc.

The crane comprises a crane boom system 6, comprising crane components that includes a crane tip 8 arranged at a free end of an outermost crane boom. A tool (not shown) is preferably arranged at the crane tip 8. Depending on the application and the type of tool, the crane tip may be the arranged on the actual tool. The tool may be attached to, or provided with, an object manipulator, e.g. a rotator, controlling the movement, e.g. the rotation, of the tool. This may introduce another degree of freedom to the system. The tool may be any type of tool required to achieve any working assignment, e.g. a hook, a fork, a gripping tool, or a forestry tool.

The crane components comprise e.g. a crane column arranged to rotate around a vertical axis, and a plurality of crane booms pivotally connected to, or extendable from, each other. For example, a first crane boom and a telescopically extendable second boom are provided, being connected to the crane column. The present invention may be applied to cranes with complex crane boom systems, for example cranes comprising a plurality of telescopically extendable crane booms, often referred to as jibs.

The crane further comprises a system of actuators 10 of the crane boom system 6 configured to apply movements to the crane boom system such that the crane tip 8 is moved from a current position to another position in response to receiving operating instructions. As an illustrating example, the system of actuators of the crane boom system is arranged to generate rotational movement of the crane column around the vertical axis, pivoting movements of the crane booms in relation to each other and/or the crane column, and optionally extending crane boom extensions of telescopic crane booms, so that the crane tip is moved from the current position to another position in response to receiving operating instructions.

A sensor system 12 is provided, configured to monitor current positions of the crane components, and, operating conditions of the system of actuators 10. The sensor system is further configured to generate sensor signals 14 in response to the monitored current positions and operating conditions.

The sensor system comprises, for example, angular sensors and length sensors mounted to the booms of the crane, pressure sensors mounted to hydraulic cylinders actuating the movements of the crane booms. The sensor system hence monitors the positions of the crane parts as well as the operating performance of actuators moving the crane booms and extensions. Additional sensors like radars, cameras, thermal cameras, LIDARs etc. may be provided to monitor the area surrounding the crane for persons, obstacles etc. These sensors may alternatively or in addition to these applications be used to monitor the positions of the crane parts, and may also form part of the sensor system.

The crane also comprises a control interface 16 arranged to receive a trajectory instruction 18 for the crane tip 8 from an input unit 20.

The trajectory instruction 18 for the crane tip 8 comprises at least one wanted position of the crane tip 8. More particularly, a trajectory instruction 18 is here defined to comprise at least one future wanted position of the crane tip. In addition it could further comprise additional wanted positions of the crane tip in a sequence or path, as well as the speed or velocity of the tip of the crane at different positions. The position(s) in the trajectory instruction 18 may be described by using a coordinate system of the crane, and the positions may be defined as coordinates in the coordinate system or using a relation or difference to a present or a previous point.

A crane controller 22 is also provided, that comprises the control interface 16. The crane controller is arranged to determine the movements of the crane components applied by the system of actuators 10 of the crane boom system 6, based on the received trajectory instruction 18 for the crane tip 8 and the current position of the crane boom system 6 as defined by the received sensor signals 14 from the sensor system 12.

The crane controller 22 comprises a machine learning algorithm including a neural network trained to calculate the movements of the crane components based on the received trajectory instruction 18 in relation to the current position of the crane boom system 6. Depending on how many degrees of freedom the crane boom system offers, the same trajectory may be achieved by moving the crane components in different ways. The neural network may be further trained to calculate the movements of the crane components to take into account the lifting capacity, the energy efficiency, and/or the speed of the movement if there are several degrees of freedom (i.e. if the movements could be realized by various alternatives).

The movements of the crane components calculated by the neural network may comprise operating instructions 24 for the system of actuators 10 of the crane boom system 6. Alternatively, the movements of the crane components calculated by the neural network may be further transformed into operating instructions 24 for the system of actuators 10 of the crane boom system 6 by the crane controller 22.

Figure 3:
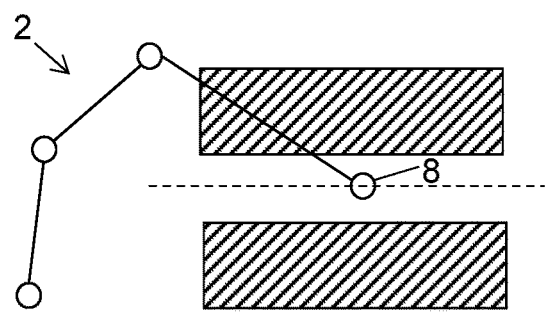
FIG. 3 is a schematic illustration of a crane according to the present invention in relation to a trajectory line.

The crane 2 also comprises a supervisory controller 26 arranged to evaluate the calculated movements of the crane components generated by the crane controller 22, by comparing an accuracy measure to a predefined safety margin. The accuracy measure is defined by the difference between a crane tip position resulting from the calculated movements of the crane components when moved from its current position, and a position of the crane tip 8 calculated by the supervisory controller 24, based on the received trajectory instruction 18 and on positions of individual joints of the crane boom system 6, when moved from the current position. The positions of the individual joints are measured by the sensor system 12 that applies sensor signals 14, including measurement values of the individual joints, to the supervisory controller. The supervisory controller is also arranged to generate an overruling operating instruction 28 for the system of actuators 10, such as an operating instruction to stop moving, or an operating instruction to slow down the movement, in response to the accuracy measure being larger than the predefined safety margin. In FIG. 3 a simplified illustration of a crane 2 provided with a crane tip 8 is shown. The crane tip 8 is to be moved along a trajectory which is indicated by a dashed horizontal line. The safety margin is the distance between the trajectory and a space not allowed for movement of the crane tip, which in FIG. 3 is indicated by dashed rectangles. In addition to the safety margin in distance, the supervisory controller 26 may evaluate one or many other parameters based on the calculated movements of the crane components by comparison to valid operating ranges or safety margins. Examples of such other parameters are the speed that the crane tip is travelling with, the pressures or forces applied to the individual actuators of the crane or the distance between a part of the crane boom system to a forbidden working area. Examples of forbidden areas may be predefined around e.g. the truck cabin, or dynamically defined using sensor input, e.g. for detected moving objects in the working area of the crane.

According to one embodiment, the crane tip position resulting from the calculated movements of the crane components when moved from its current position during evaluation by the supervisory controller 26, is a simulated or verified crane tip position.

In the case where the crane tip position is simulated, it is a predicted position resulting from the calculated movements.

If the crane tip position instead is a verified position, the evaluation performed by the supervisory controller may then be performed in real-time, e.g. the movement is performed stepwise to consecutive points along a trajectory and it is evaluated for each point that the crane tip position is within the safety margin.

According to another embodiment, the neural network of the machine learning algorithm is configured to calculate the movements of the crane components by applying inverse kinematic calculations.

In still another embodiment, the supervisory controller 26 is configured to calculate said position of the crane tip 8 by applying forward kinematic calculations.

Inverse kinematics is the mathematical process of recovering the movements of an object in the world from some other data, such as a film of those movements, or a film of the world as seen by a camera which is itself making those movements. This is useful e.g. in robotics and in film animation.

In robotics, inverse kinematics makes use of the kinematics equations to determine the joint parameters that provide a desired position for each of the robot's end-effectors. Specification of the movement of a robot so that its end-effectors achieve the desired tasks is known as motion planning. Inverse kinematics transforms the motion plan into joint actuator trajectories for the robot. This is applicable and preferably applied herein when determining operating instructions of a crane based upon a received trajectory instruction. The movement of a kinematic chain, e.g. of a robot or a crane, is modelled by the kinematics equations of the chain. These equations define the configuration of the chain in terms of its joint parameters. Forward kinematics uses the joint parameters to compute the configuration of the chain, and inverse kinematics reverses this calculation to determine the joint parameters that achieve a desired configuration. Thus, forward kinematics refers to the use of the kinematic equations of a robot to compute the position of the end-effector from specified values for the joint parameters, and the reverse process that computes the joint parameters that achieve a specified position of the end-effector is known as inverse kinematics.

The input unit 20 comprises a control unit configured to be operated by a crane operator or an automatic crane path planner. The control unit may be a hand-held remote control unit adapted to receive high level operating commands input to the control unit by a crane operator. The crane operator could be present at the working area of the crane or at a remote distance from the crane in a control centre. The high level operating commands could further be automatically generated by an automatic crane path planner which, based on a working assignment or similar, extracts a wanted trajectory for the crane tip. As stated above, the input unit 20 then determines and applies the trajectory instruction 18 both to the crane controller 22, and to the supervisory controller 26.

Thus, a machine learning algorithm is provided that includes a neural network trained to calculate the movements of the crane components based on the received trajectory instruction 18 in relation to the current position of the crane boom system 6. Generally, machine learning algorithms, herein implemented by a neural network, build a mathematical model based on sample data, known as "training data", in order to make predictions or decisions without being explicitly programmed to perform the task.

Machine learning algorithms are used in a wide variety of applications, such as email filtering and computer vision, where it is difficult or infeasible to develop a conventional algorithm for effectively performing the task.

In a further embodiment, the supervisory controller 26 is further arranged to evaluate the calculated movements of the crane components by comparing at least one additional parameter resulting from the calculated movements of the crane components with a valid operating range or a safety margin. Preferably, the at least one additional parameter comprise the speed that the crane tip is travelling with, the pressures or forces applied to the individual actuators of the crane, or the distance between a part of the crane boom system to a forbidden working area.

The present invention also relates to a vehicle 4 comprising a crane 2 as described above. The vehicle is schematically illustrated in FIG. 1.

Figure 4:
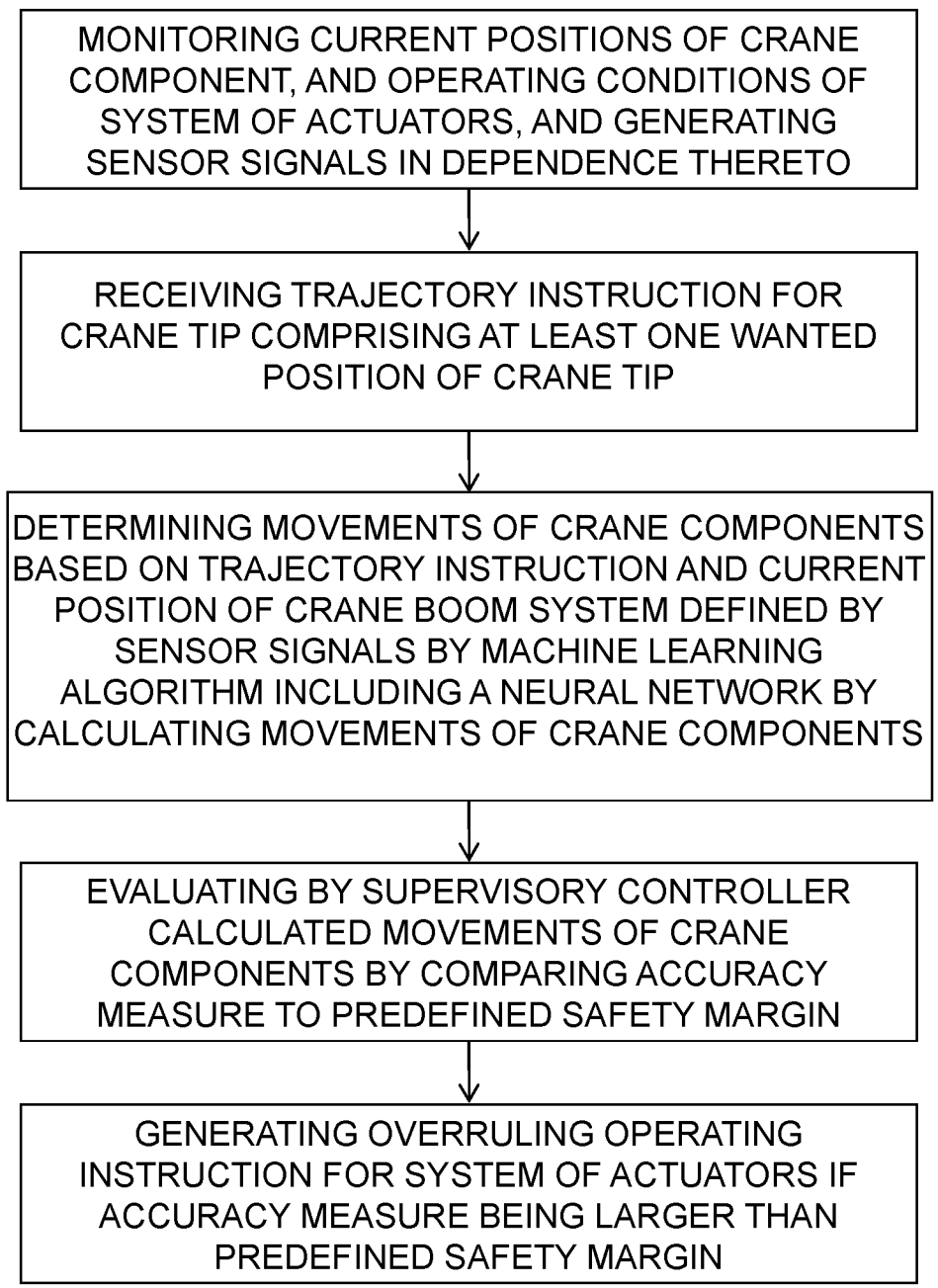
FIG. 4 is a flow diagram illustrating the method according to the present invention.

In addition, the present invention relates to a method of a crane 2 arranged to be mounted to a vehicle 4. The method will now be described with references to the flow diagram shown in FIG. 4.

The crane 2 has been described above with references to FIGS. 1-3, and it is herein referred to that description. Thus, the crane comprises a crane boom system 6, comprising crane components including a crane tip 8 arranged at a free end of an outermost crane boom, and a system of actuators 10 of the crane boom system 6 configured to apply movements to the crane boom system such that the crane tip 8 is moved from a current position to another position in response to received operating instructions 24.

The method comprises:
  monitoring, by a sensor system 12, current positions of the crane components, and, operating conditions of the system of actuators 10, and generating sensor signals 14 in response to the monitored current positions and operating conditions;
  receiving, by a control interface 16, a trajectory instruction 18 for the crane tip 8 from an input unit 20, the trajectory instruction 18 for the crane tip 8 comprising at least one wanted position of the crane tip 8, and
  determining, by a crane controller 22, the movements of the crane components applied by the system of actuators 10 of the crane boom system 6, based on the received trajectory instruction 18 for the crane tip 8 and the current position of the crane boom system 6 as defined by the received sensor signals 14 from the sensor system 12.

The method further comprises determining the movements of the crane components, by the crane controller 22 that comprises a machine learning algorithm including a neural network, by calculating the movements of the crane components based on the received trajectory instruction 18 in relation to the current position of the crane boom system 6.

The movements of the crane components calculated by the neural network may comprise operating instructions 24 for the system of actuators 10 of the crane boom system 6. Alternatively, the movements of the crane components calculated by the neural network may be further transformed into operating instructions 24 for the system of actuators 10 of the crane boom system 6 by the crane controller 22.

The method then comprises evaluating, by a supervisory controller 26, the calculated movements of the crane components generated by the crane controller 22, by comparing an accuracy measure to a predefined safety margin.

The accuracy measure is defined by the difference between a crane tip position resulting from the calculated movements of the crane components when moved from its current position, and a position of the crane tip 8 calculated by the supervisory controller 24, based on the received trajectory instruction 18 and on positions of individual joints of the crane boom system 6, when moved from the current position.

The method comprises generating an overruling operating instruction 28 for the system of actuators 10, such as an operating instruction to stop moving, or an operating instruction to slow down the movement, in response to the accuracy measure being larger than the predefined safety margin.

In one embodiment of the method, the crane tip position resulting from the calculated movements of the crane components when moved from its current position during evaluation by the supervisory controller 26, is a simulated or verified crane tip position.

According to a further embodiment, the method comprises calculating, by the neural network of the machine learning algorithm, the movements of the crane components by applying inverse kinematic calculations.

In another embodiment, the method comprises calculating, by said supervisory controller 26, the position of the crane tip 8 by applying forward kinematic calculations.

The applied calculation methods, inverse kinematic calculations, and forward kinematic calculations, are discussed more in detail above in the description of the crane, and it is herein referred to that description.

In another embodiment, the method comprises evaluating, by the supervisory controller, the calculated movements of the crane components by comparing at least one additional parameter resulting from the calculated movements of the crane components with a valid operating range or a safety margin. Preferably, the at least one additional parameter comprise the speed that the crane tip is travelling with, the pressures or forces applied to the individual actuators of the crane, or the distance between a part of the crane boom system to a forbidden working area.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A crane arranged to be mounted to a vehicle, the crane comprising:
  a crane boom system, comprising crane components that includes a crane tip arranged at a free end of an outermost crane boom;
  a system of actuators of the crane boom system configured to apply movements to the crane boom system such that the crane tip is moved from a current position to another position in response to received operating instructions;
  a sensor system configured to monitor current positions of the crane components, and, operating conditions of the system of actuators, and to generate sensor signals in response to the monitored current positions and operating conditions;
  a control interface arranged to receive a trajectory instruction for the crane tip from an input unit, the trajectory instruction for the crane tip comprising at least one wanted position of the crane tip, and
  a crane controller arranged to determine the movements of the crane components applied by the system of actuators of the crane boom system, based on the received trajectory instruction for the crane tip and the current position of the crane boom system as defined by the received sensor signals from the sensor system, wherein the crane controller comprises a machine learning algorithm, including a neural network trained to calculate the movements of the crane components based on the received trajectory instruction in relation to the current position of the crane boom system, and wherein the crane further comprises a supervisory controller arranged to:

evaluate the calculated movements of the crane components generated by the crane controller, by comparing an accuracy measure to a predefined safety margin, wherein the accuracy measure is defined by the difference between a crane tip position resulting from the calculated movements of the crane components when moved from its current position, and a position of the crane tip calculated by the supervisory controller, based on the received trajectory instruction and on positions of individual joints of said crane boom system, when moved from the current position, the crane components including a crane column arranged to rotate around a vertical axis, and a plurality of crane booms pivotally connected to, or extendable from, each other, and the supervisory controller further being arranged to:

generate an overruling operating instruction for the system of actuators in response to the accuracy measure being larger than the predefined safety margin, wherein the neural network of the machine learning algorithm is configured to calculate the movements of the crane components by applying inverse kinematic calculations, wherein said supervisory controller is configured to calculate said position of the crane tip by applying forward kinematic calculations.

2. The crane according to claim 1, wherein said crane tip position resulting from the calculated the movements of the crane components when moved from its current position during evaluation by the supervisory controller, is a simulated or verified crane tip position.

3. The crane according to claim 1, wherein said input unit comprises a control unit configured to be operated by a crane operator or an automatic crane path planner.

4. The crane according to claim 1, wherein said supervisory controller is further arranged to evaluate the calculated movements of the crane components by comparing at least one additional parameter resulting from the calculated movements of the crane components with a valid operating range or a safety margin.

5. The crane according to claim 4, wherein said at least one additional parameter comprise the speed that the crane tip is travelling with, the pressures or forces applied to the individual actuators of the crane, or the distance between a part of the crane boom system to a forbidden working area.

6. A method of a crane arranged to be mounted to a vehicle, the crane comprising:

a crane boom system, comprising crane components including a crane tip arranged at a free end of an outermost crane boom;

a system of actuators of the crane boom system configured to apply movements to the crane boom system such that the crane tip is moved from a current position to another position in response to received operating instructions, the method comprises:

monitoring, by a sensor system, current positions of the crane components, and, operating conditions of the system of actuators, and generating sensor signals in response to the monitored current positions and operating conditions;

receiving, by a control interface, a trajectory instruction for the crane tip from an input unit, the trajectory instruction for the crane tip comprising at least one wanted position of the crane tip, and determining, by a crane controller, the movements of the crane components applied by the system of actuators of the crane boom system, based on the received trajectory instruction for the crane tip and the current position of the crane boom system as defined by the received sensor signals from the sensor system, characterized in that: the method further comprises:

determining said movements of the crane components, by the crane controller that comprises a machine learning algorithm including a neural network, by calculating the movements of the crane components based on the received trajectory instruction in relation to the current position of the crane boom system, and evaluating, by a supervisory controller, the calculated movements of the crane components generated by the crane controller, by comparing an accuracy measure to a predefined safety margin, wherein the accuracy measure is defined by the difference between a crane tip position resulting from the calculated movements of the crane components when moved from its current position, and a position of the crane tip calculated by the supervisory controller, based on the received trajectory instruction and on positions of individual joints of said crane boom system, when moved from the current position, the crane components including a crane column arranged to rotate around a vertical axis, and a plurality of crane booms pivotally connected to, or extendable from, each other, and the method further comprising:

generating an overruling operating instruction for the system of actuators in response to the accuracy measure being larger than the predefined safety margin, calculating, by the neural network of the machine learning algorithm, the movements of the crane components by applying inverse kinematic calculations, calculating, by said supervisory controller, said position of the crane tip by applying forward kinematic calculations.

7. The method according to claim 6, wherein said crane tip position resulting from the calculated movements of the crane components when moved from its current position during evaluation by the supervisory controller, is a simulated or verified crane tip position.

8. The method according to claim 6, comprising evaluating, by said supervisory controller, the calculated movements of the crane components by comparing at least one additional parameter resulting from the calculated movements of the crane components with a valid operating range or a safety margin.

9. The method according to claim 8, wherein said at least one additional parameter comprise the speed that the crane tip is travelling with, the pressures or forces applied to the individual actuators of the crane, or the distance between a part of the crane boom system to a forbidden working area.

10. A vehicle comprising a crane according to claim 1.

11. The crane according to claim 1, wherein the overruling operating instruction for the system of actuators includes an operating instruction to stop moving.

12. The method according to claim 6, wherein the overruling operating instruction for the system of actuators includes an operating instruction to stop moving.

\* \* \* \* \*